US006685291B1

(12) United States Patent
Naoi

(10) Patent No.: US 6,685,291 B1
(45) Date of Patent: Feb. 3, 2004

(54) PRINTING APPARATUS AND PRINTING METHOD

(75) Inventor: Masaaki Naoi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/718,419

(22) Filed: Nov. 24, 2000

(30) Foreign Application Priority Data

Nov. 29, 1999 (JP) .......................................... 11-338228

(51) Int. Cl.[7] .......................... B41J 29/38; G01D 15/10
(52) U.S. Cl. .......................................... 347/12; 347/182
(58) Field of Search ..................... 347/12, 13, 180–182

(56) References Cited

U.S. PATENT DOCUMENTS

| | | | | |
|---|---|---|---|---|
| 4,313,124 A | | 1/1982 | Hara | 347/57 |
| 4,345,262 A | | 8/1982 | Shirato et al. | 347/10 |
| 4,459,600 A | | 7/1984 | Sato et al. | 347/47 |
| 4,463,359 A | | 7/1984 | Ayata et al. | 347/56 |
| 4,558,333 A | | 12/1985 | Sugitani et al. | 347/65 |
| 4,608,577 A | | 8/1986 | Hori | 347/66 |
| 4,723,129 A | | 2/1988 | Endo et al. | 347/56 |
| 4,740,796 A | | 4/1988 | Endo et al. | 347/56 |
| 5,568,171 A | * | 10/1996 | Keefe et al. | 347/58 |
| 5,896,146 A | * | 4/1999 | Murata et al. | 347/42 |
| 5,933,161 A | * | 8/1999 | Sato et al. | 347/12 |
| 6,027,197 A | * | 2/2000 | Kaburagi et al. | 347/9 |
| 6,126,261 A | * | 10/2000 | Yamanaka | 347/12 |
| 6,145,948 A | * | 11/2000 | Kishida | 347/13 |

FOREIGN PATENT DOCUMENTS

| | | | |
|---|---|---|---|
| JP | 54-56847 | 5/1979 | B41M/5/26 |
| JP | 59-123670 | 7/1984 | B41J/3/04 |
| JP | 59-138461 | 8/1984 | B41J/3/04 |
| JP | 60-71260 | 4/1985 | B41J/3/04 |
| JP | 4-133741 | 5/1992 | |
| JP | 8-132621 | 5/1996 | |
| JP | 10-181040 | 7/1998 | |
| JP | 10-258523 | 9/1998 | |

* cited by examiner

*Primary Examiner*—Stephen D. Meier
*Assistant Examiner*—Alfred E Dudding
(74) *Attorney, Agent, or Firm*—Fitzpatrick, Cella, Harper & Scinto

(57) ABSTRACT

An ink-jet printing apparatus has a printhead with an array of nozzles and can reduce printing time. The printing elements are divided into plural blocks, each having a predetermined number of nozzles. The blocks to be used for printing are selected based on information to be printed. Blocks from among the selected blocks are designated by a start block designation register and an end block designation register, and a counter is controlled to operate only for the selected blocks to drive the printing elements therein. In this manner, high-speed printing can be performed by avoiding unnecessary discharge control of nozzles not used in printing.

16 Claims, 10 Drawing Sheets

REPLACEMENT SHEET

PRINTING APPARATUS AND PRINTING METHOD

FIELD OF THE INVENTION

The present invention relates to a printing apparatus and a printing method, and more particularly, to a reduction in a printing time with respect to a printing apparatus for printing by using a printhead having an array of printing elements and a printing method for the printing apparatus.

BACKGROUND OF THE INVENTION

As an information output device for a word processor, a personal computer, a facsimile machine and the like, a printer, which performs printing based on information of desired characters and images, on a sheet-type print medium such as a print sheet or a film, is known.

As a printing method of the printer, various methods are known. In recent years, attention has been especially paid to an ink-jet method because of its capability of printing without contact with a print sheet, low running cost, readiness of color printing and quiet printing by a non-impact method.

Further, among ink-jet printing apparatuses, a full-line type printing apparatus, having a printhead having arrayed printing elements (nozzles) corresponding to the width of maximum printing area of print medium, for performing printing while transferring the print medium, has become widely used because printing at higher speed is possible.

In color printing by this full-line type printing apparatus, reduction in printing speed is prevented by arranging the plural printheads to discharge ink of different colors in a transfer direction of the print medium for simultaneous ink discharge from the respective printheads.

As the full-line type printhead (long head) has several thousands of ink discharge nozzles, the nozzles are divided into several blocks, and discharge control is performed by using the combination of two types of control signals.

FIG. 5 is a block diagram showing the construction of a drive control circuit of the full-line type printhead in a case where discharge control is performed on 24 nozzles divided into six 4-nozzle blocks.

In FIG. 5, reference numeral 111 denotes a discharge control signal generation circuit common to all the nozzles; 112, a nozzle designation circuit to determine nozzles to discharge ink; 113, a nozzle designation decoder to designate a nozzle to be driven among the four nozzles of each block; 114, a block designation decoder to designate a block to be driven among the six blocks; 115, 3-input AND gates provided for the respective nozzles; and 116, discharge circuits for the respective nozzles.

Further, symbol ENB denotes a discharge control signal; NSEL (0–1), a binarized nozzle designation code signal to designate a nozzle to discharge ink in each block; NZL (1–4), a nozzle designation signal obtained by decoding the nozzle designation code signal by the nozzle designation decoder 113; BSEL (0–2), a binarized block designation code signal to designate a block to discharge ink; BLK (1–6), a block designation signal obtained by decoding the block designation code signal by the block designation decoder 114; and HEET (1–24), a discharge control signal for each nozzle.

FIG. 6 is a timing chart showing respective signal states when the first to twenty-fourth nozzles are sequentially driven. Symbol CNT denotes a signal from a counter in the nozzle designation circuit 112. When the counter value is "0", the first nozzle is driven; when the counter value is "1", the second nozzle is driven; and when the counter value is "23", the twenty-fourth nozzle is driven.

In this manner, in accordance with change of the counter value from "0" to "23", the signal states are changed as shown, to sequentially drive all the 24 nozzles from the first nozzle in synchronization with the counter value change.

FIG. 7 schematically shows a general structure of a printing apparatus having the full-line type printhead. The printing apparatus has a sheet feed section 2 to feed a print medium to a printing area, a transfer section 3 to transfer the print medium, a sheet discharge section 4 to discharge the print medium on which printing has been completed, and a full-line type printhead section 7 fixed in a vertical direction to a transfer direction.

As an operation upon printing, the sheet feed section 2 feeds a print medium P to the transfer section 3, then the transfer section 3 transfers the print medium P to pass the full-line type printhead section 7 while printing is performed. Since printing is performed in a fixed position, the length of the full-line type printhead section 7 is longer than that of the print medium P appropriate for printing by the printing apparatus in an orthogonal direction to the transfer direction (hereinafter "print medium width").

As described above, the printing apparatus using the full-line type printhead, that performs printing while passing a print medium through the printing area of the fixed printhead, is appropriate for printing at higher speed than that of the so-called serial type printing apparatus which performs printing by repeating scanning of a printhead mounted on a carriage and transfer of the print medium.

However, in the conventional printing apparatus using the full-line type printhead, discharge control is performed at timing the same as that of discharge control in use of all the nozzles, regardless of print medium width and the width of actual printing area.

Actually, wasteful discharge control is performed on nozzles in positions where printing is not performed, which disturbs further reduction of printing period.

Further, with regard to nozzles which are not actually used, preliminary discharge (idle discharge) must be performed periodically. However, in the conventional apparatus, after printing for a predetermined amount, e.g., printing for one print sheet, preliminary discharge is performed on all the nozzles regardless of actual used/unused states of the nozzles.

Accordingly, the preliminary discharge consumes a large amount of ink, and takes much time. This especially influences continuous printing on plural print media.

SUMMARY OF THE INVENTION

The present invention has been made in consideration of the above situation, and can provide a printing apparatus and method for high-speed printing by performing drive control only on printing elements requiring drive control while omitting drive control on printing elements not requiring drive control.

This can be attained by a printing apparatus which performs printing by using a printhead having an array of printing elements, comprising: block selection means for dividing the array of printing elements into a plurality of blocks, each having a predetermined number of printing elements, and selecting blocks to be used for printing among the plural blocks; block designation means for designating from among the blocks selected by the block selection means; printing element designation means for designating a printing element to be driven in each of the designated blocks; and drive control means for driving respective printing elements by operating the printing element designation means only for the blocks selected by the block selection means.

Further, this can be attained by a printing method for performing printing by using a printhead having an array of printing elements, comprising: a block selection step of dividing the array of printing elements into plural blocks, each having a predetermined number of printing elements, and selecting blocks to be used for printing among the plural blocks; a block designation step of designating from among the blocks selected in the block selection step; a printing element designation step of designating a printing element to be driven in each of the designated blocks; and a drive control step of driving respective printing elements by performing the printing element designation step only for the blocks selected in the block selection step.

That is, according to the present invention as described above, for performing printing in accordance with input information by a printhead having an array of printing elements, the array of printing elements is divided into plural blocks, each having a predetermined number of printing elements, and blocks to be used for printing among the plural blocks are selected, blocks from among the selected blocks are designated, a printing element to be driven in each of the designated blocks is designated, and respective printing elements only in the selected blocks are driven.

By this arrangement, the drive control procedure on a block not actually driven can be omitted.

Further, in an ink-jet printing method or the like, in a case where preliminary discharge must be performed on printing elements (nozzles) not used in printing, the preliminary discharge can be performed only on printing elements which have not been actually used in printing. Thus the period of preliminary discharge can be reduced, and the period of printing can be reduced when printing is continuously performed.

Note that as the block designation, it is preferable that the block designation means designates a block within a range from a first block number to a second block number as a block to be actually driven, or the block designation means designates blocks within two ranges including a first block number and a second block number as blocks to be actually driven.

In this case, it is preferable that the block designation means has plural registers for storing a block number of the designated block.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First, an ink-jet printing apparatus as a representative embodiment to which the present invention is applied will be described with reference to FIGS. 8 to 10.

Figure 8:
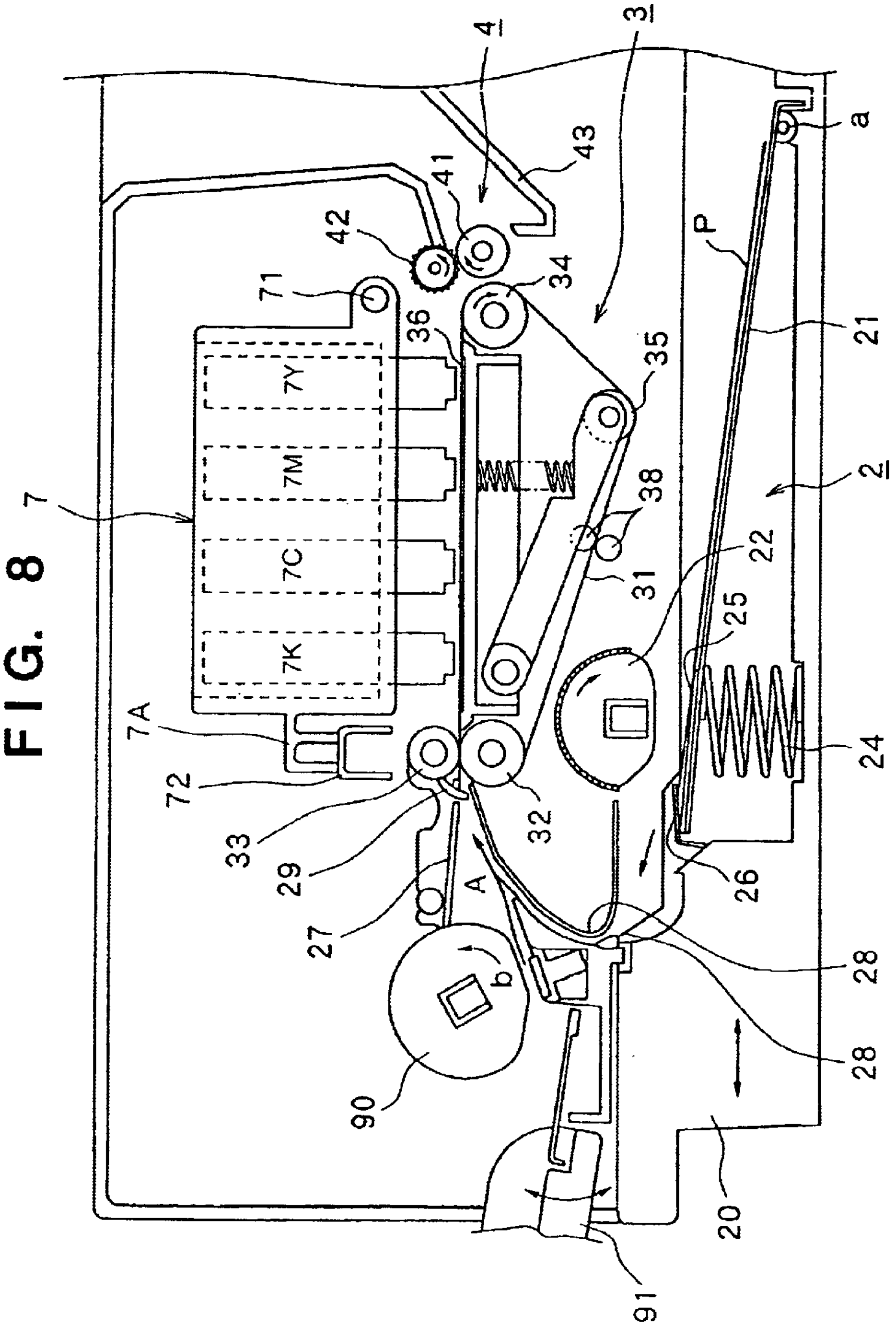
FIG. 8 is a cross-sectional view showing the entire structure of ink-jet printing apparatus according to a representative embodiment of the present invention.
Figure 9:
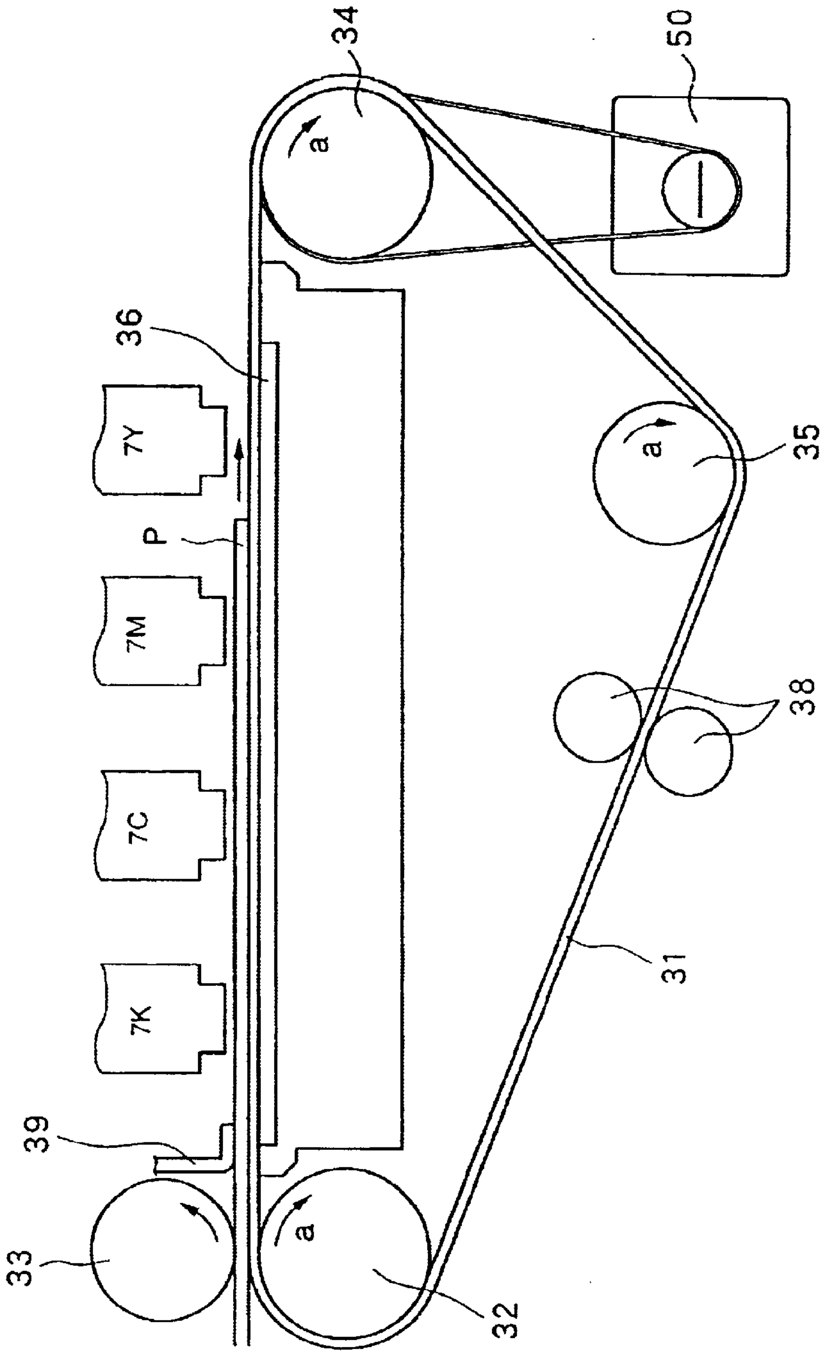
FIG. 9 is a cross-sectional view showing the construction of a transfer section of the printing apparatus in FIG. 8.

FIGS. 8 and 9 are sectional views showing the structure of the ink-jet printing apparatus. FIG. 8 shows the entire structure of the printing apparatus, and FIG. 9, the construction of a transfer section 3 of the printing apparatus.

The printing apparatus of the embodiment has an automatic document feeder, and comprises a sheet feed section 2, a transfer section 3, a sheet discharge section 4 and a printhead section 7. These sections are divided into the respective parts as follows and brief descriptions of these parts will be made sequentially. Hereinbelow, (I) sheet feed section, (II) transfer section, (III) printhead, and (IV) sheet discharge section will be described.

(I) Sheet Feed Section

In the sheet feed section 2, a pressing plate 21 on which a print sheet P is, placed and a rotary sheet feed member 22 for feeding the print sheet P are attached to a base 20. The pressing plate 21 is rotatable on a rotation shaft a connected to the base 20, and is biased to the rotary sheet feed member 22 by a pressing plate spring 24. A separation pad 25 of material having a high friction coefficient such as artificial leather is provided in a portion of the pressing plate 21 opposite to the rotary sheet feed member 22, for prevention of multiple transfer of print sheets P. Further, a separation claw 26 covering corners of the print sheets P in one direction, for separating the print sheets P one by one, and a release cam (not shown) for release of contact between the pressing plate 21 and the rotary sheet feed member 22, are provided on the base 20.

In the above construction, in a stand-by state, the release cam presses the pressing plate 21 down to a predetermined position, thereby the contact between the pressing plate 21 and the rotary sheet feed member 22 is released. In this state, when R driving force of a transfer roller 32 is transmitted via a gear or the like to the rotary sheet feed member 22 and the release cam, the release cam moves away from the pressing plate 21. Then the pressing plate 21 moves upward, and the rotary sheet feed member 22 comes into contact with the print sheet P. The print sheet P is picked up in accordance with the rotation of the rotary sheet feed member 22, thus sheet feeding is started. The print sheets P are separated by the separation claw 26 one by one and fed to the transfer section 3. The rotary sheet feed member 22 rotates until the print sheet P is sent to the transfer section 3, then enters the stand-by state where the contact between the print sheet P and the rotary sheet feed member 22 is released, and then the driving force from the transfer roller 32 is stopped.

Numeral 90 denotes a rotary sheet feed member for manual sheet feeding. In accordance with a printing command signal from a computer, the rotary sheet feed member 90 feeds the print sheet P set on a manual sheet feeding tray 91 to the transfer roller 32.

(II) Transfer Section

The transfer section 3 has a transfer belt 31 to attract and transfer the print sheet P and a PE (paper end) sensor (not shown). The transfer belt 31 is driven by a drive roller 34, and is wound around a transfer roller 32 and a pressure roller 35 as driven rollers.

The transfer belt 31 and a driven pinch roller 33, in contact with each other, are provided in a position opposite to the transfer roller 32. The pinch roller 33, pressed by a spring (not shown) against the transfer belt 31, guides the print sheet P to the printing area. Further, an upper guide 27 and a lower guide 28 for guiding the print sheet P are provided at an entrance of the transfer section 3 to which the print sheet P is transferred. Further, the upper guide 27 has a PE sensor lever 29 to notify the PE sensor (not shown) of detection of front and rear ends of the print sheet P. Further, the print head 7 which forms an image based on image information is provided on the downstream side of the transfer roller 32 in the print sheet transfer direction.

In the above construction, the print sheet P sent by the transfer section 3, guided by the upper guide 27 and the lower guide 28, is sent to the pair of transfer roller 32 and the pinch roller 33. At this time, the front end of the transferred print sheet P is detected by the PE sensor lever 29, thereby a printing position for the print sheet P is determined. Further, the print sheet P is transferred by rotation of the transfer belt 31 via the transfer roller 32 by an ultrasonic motor to be described later.

(III) Printhead Section

As the printhead section 7 of this embodiment, a full-line type ink-jet printhead where plural nozzles are arrayed in a direction orthogonal to the transfer direction of the print sheet P is used. Further, in this embodiment, printheads 7K (black), 7C (cyan), 7M (magenta) and 7Y (yellow) are arranged at predetermined intervals sequentially from the upstream side in the transfer direction of the print sheet P. The printhead section 7 is attached to a head holder 7A.

The printhead section 7 applies heat to ink by heaters or the like. The ink is film-boiled by the heat, and growth or contraction of bubbles due to the film boiling causes pressure change to discharge the ink from a nozzle of the printhead section 7, thus forming an image on the print sheet P.

In the printhead section 7, one end is rotatably fixed by a shaft 71, and a projection 7A at the other end is engaged with a rail 72. Thus the distance between the nozzle surface and the print sheet P is defined.

Note that ink tanks containing ink and the printhead may be integrated as an exchangeable ink cartridge; otherwise, the ink tank portion may be separated from the printhead such that only the ink tank need be exchanged for new one when the ink is exhausted.

(VI) Sheet Discharge Section

The sheet discharge section 4 has a sheet discharge roller 41 and a spur 42. The print sheet P on which image formation has been made by the printhead section is held and transferred between the sheet discharge roller 91 and the spur 42 to a sheet discharge tray 43.

Next, the construction and operation of attraction-transfer at the printing area will be described.

The transfer belt 31, which attracts the print sheet P and moves while holding the print sheet, comprises a synthetic resin material such as polyethylene or polycarbonate having a thickness of about 0.1 mm to 0.2 mm in an endless belt shape. Numeral 36 denotes attraction force generating means, which is fixed in a position opposite to the printhead section 7, and which generates an attraction force in the transfer belt 31 by application of voltage of about 0.5 kV to 10 kV at a portion thereof where printing by the printhead section 7 is effected. The attraction force generating means 36 is connected to a high voltage power source (not shown) to generate a predetermined high voltage.

As described above, the rollers 32, 34 and 35 support the transfer belt 31 and provide appropriate tension to the belt. The roller 34 is connected to a drive roller control motor 50. Further, a sheet pressing member 39 as pressing means for pressing the print sheet P against the transfer belt is attached on the rotation shaft of the pinch roller 33 as a rotation shaft, and is biased by biasing means (not shown) to the transfer belt 31 side. The sheet pressing member 39 comprises a conductive metal plate.

Numeral 38 denotes a pair of cleaning rollers holding the belt 31 therebetween, which comprise a sponge including small-diameter (preferably 10 $\mu$m to 30 $\mu$m) pores for absorption of ink to remove ink stain or the like attached to the belt 31 and for attaining durability by prevention of degradation.

Next, the operation in printing will be described.

The print sheet P, held between the pinch roller 33 and the transfer belt 31, is guided to the printing area. Then, in a state where the print sheet is pressed by the sheet pressing member 39 against the transfer belt 31, the print sheet P enters an attraction-force generating portion, where the print sheet is attracted to a flat surface of the transfer belt 31 by the attraction force supplied from the attraction force generating means 36. The print sheet P is sent in an arrow a direction by the drive roller control motor 50 and the roller 34, while printing is performed on the surface of the print sheet. At this time, as the transfer belt 31 holding the print sheet P has no member projecting toward the printhead section 7 side upon printing on the front and rear end portions of the print sheet P, printing can be performed such that the nozzles at both ends of the printhead and the ends of the print sheet P are in close proximity to each other. As a result, an image in high precision can be obtained.

Further, in a case where a large amount of ink has been discharged onto the print sheet P, the print sheet P swells and has cockles. In this case, as the print sheet P is attracted to the transfer belt 31 by the attraction force by the attraction force generating means 36 and the pressing force by the sheet pressing member 39, floating of the print sheet P toward the printhead section 7 side is prevented, thus stable printing can be performed without contact between the printhead section 7 and the print sheet P. Further, in a case where the end of the print sheet P is waved or curled due to environmental change such as change in temperature or humidity, the print sheet P is pressed against the transfer belt 31 by the sheet pressing member 39 and transferred to the attraction force generating portion in a state where the waves or curl is removed. Thus stable attraction can be formed in the printing area.

Figure 10:
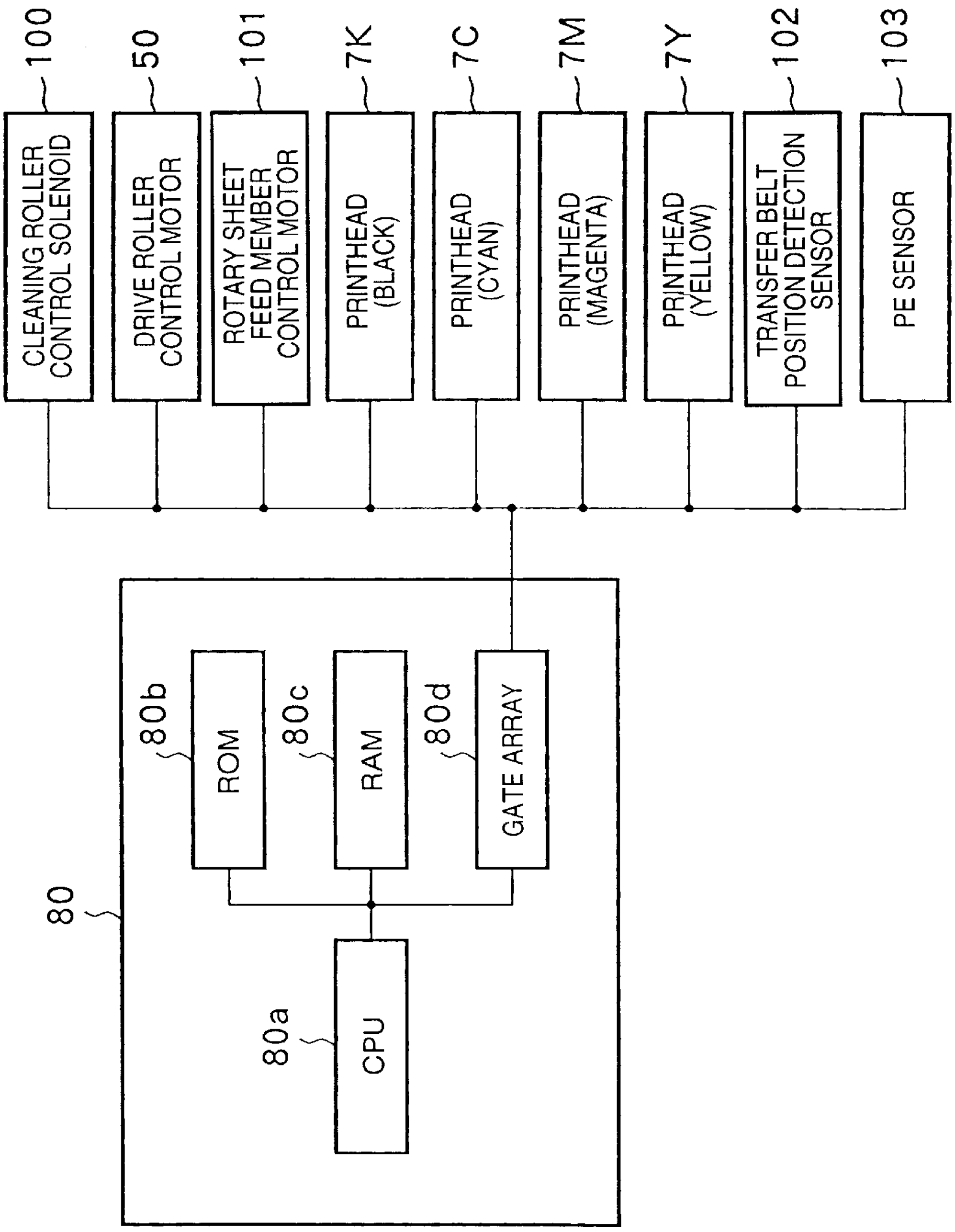
FIG. 10 is a block diagram showing a control construction of the printing apparatus in FIG. 8.

FIG. 10 is a block diagram showing the arrangement of a controller of the ink-jet printing apparatus of the present invention and devices controlled by the controller.

FIG. 10 shows the black-ink printhead 7K, the cyan-ink printhead 7C, the magenta-ink printhead 7M and the yellow-ink printhead 7Y. Numeral 100 denotes a solenoid to control the cleaning rollers; 50, a drive roller control motor to control a drive roller to drive the transfer belt; 102, a sensor to detect a reference position of the transfer belt; and 103, a sensor to detect an end of print sheet. The sensor 103 is connected to the PE sensor lever 29.

Note that although the transfer-belt position detection sensor 102 is not shown in FIGS. 8 and 9, it is provided on the rear surface side of the transfer belt between the transfer roller 32 and the pressure roller 35.

Numeral 80 denotes a controller; 80*a*, a CPU; 80*b*, a ROM for storing programs; 80*c*, a work memory necessary for control; and 80*d*, a gate array. These elements are interconnected via a system bus. The gate array 80*d* reads control signals for the drive roller control motor and a motor for the rotary sheet feed member, a control signal for the cleaning roller solenoid, an image signal to the printhead, a control signal for the printhead, information from a stain detection sensor for the transfer belt and the PE sensor.

Hereinbelow, discharge control and preliminary discharge control by the printing apparatus of the present invention will be described in detail.

First Embodiment

The first embodiment enables high-speed printing by avoiding unnecessary discharge control on nozzles which are not used in printing. In this embodiment, the nozzle designation circuit 112 of the conventional art as shown in FIG. 5 has a construction as shown in FIG. 1.

Figure 1:
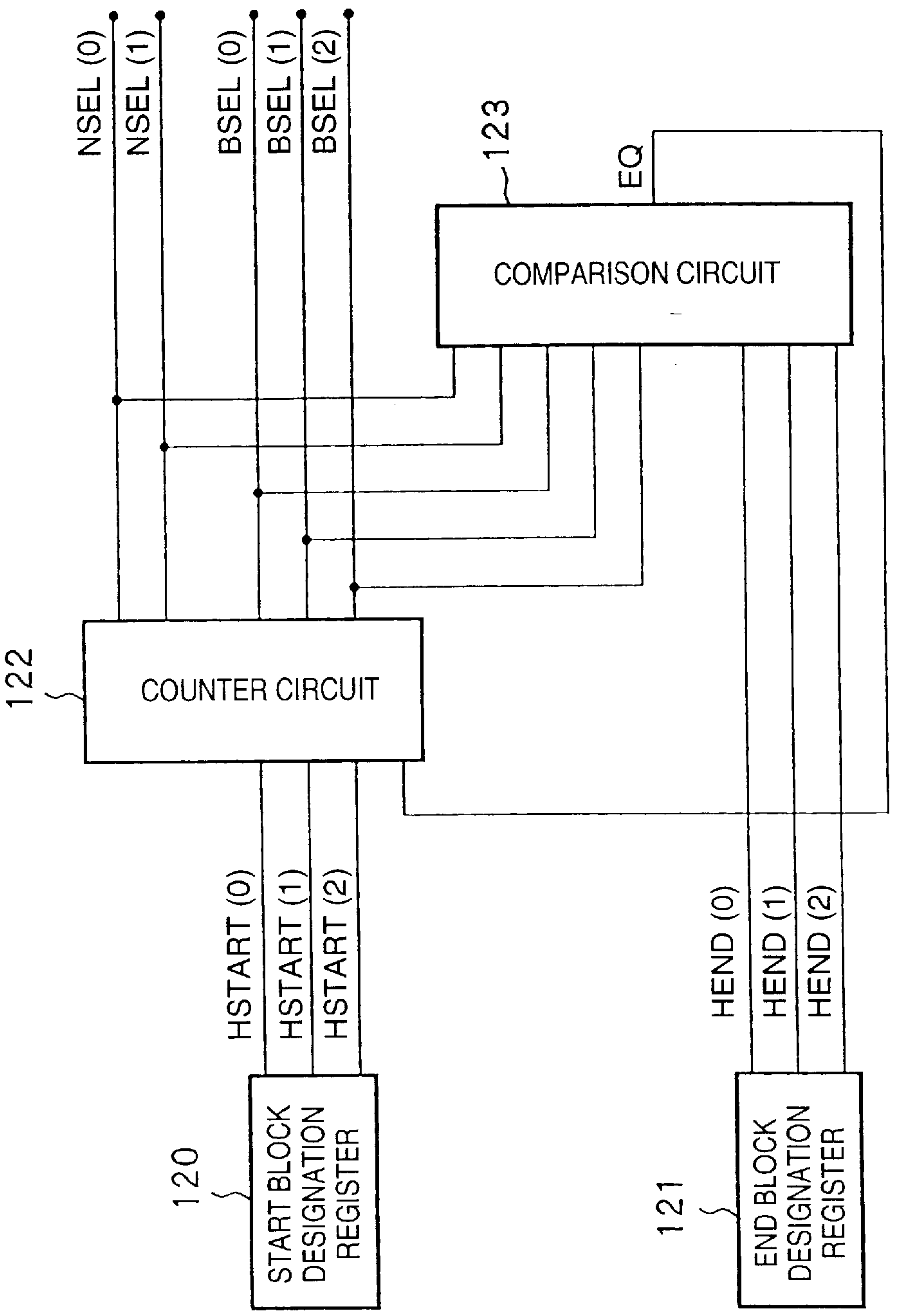
FIG. 1 is a block diagram showing the construction of a nozzle designation circuit according to a first embodiment of the present invention.
Figure 5:
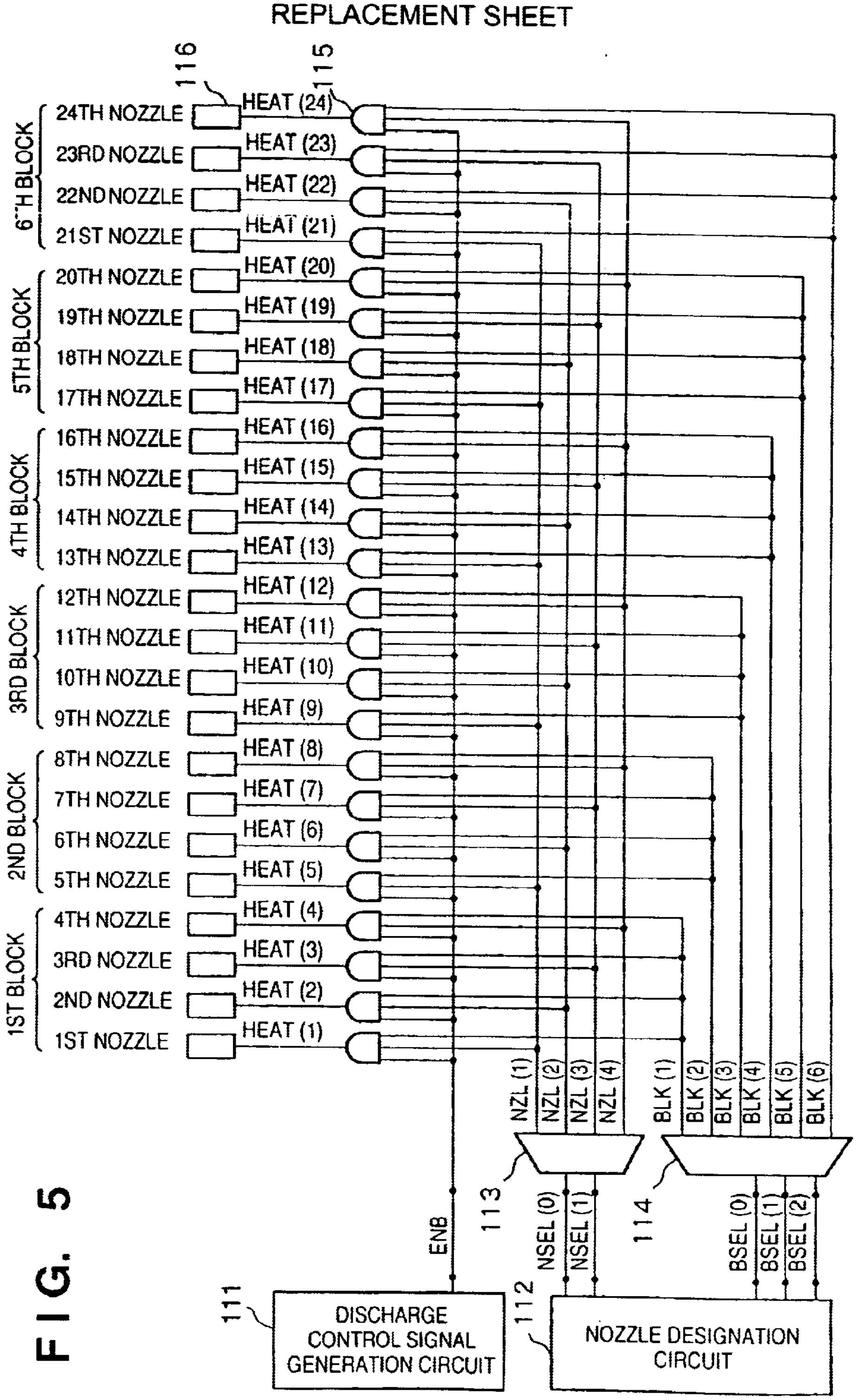
FIG. 5 is a block diagram showing the conventional discharge control circuit.

Note that in this embodiment, the circuit of FIG. 5 as well as the circuits in FIG. 1 are provided in the gate array 80*d* in FIG. 10; however, the circuits may be provided in a device other than the gate array.

In FIG. 1, numeral 120 denotes a start block designation register to set, as a block number to start discharge, a value obtained by decrementing the number of block to start discharge by "1" by a CPU or the like; 121, an end block designation register to set, as a block number to terminate discharge, a value obtained by decrementing the number of block to terminate discharge by "1" by the CPU or the like; 122, a counter circuit in which least significant two bits can be set to "0" and most significant three bits can be set to the value of the start block designation register 120, by a load signal, at the next count timing; and 123, a comparison circuit to compare output from the counter circuit 122 with output from the end block designation register 121. If the values of the least significant two bits are both "1" and the most significant three bits correspond to the value of the end block designation register 121, the counter circuit 123 outputs a value "1".

Further, symbol HSTART (0–2) denotes a start block value which is set in the start block designation register 120; HEND (0–2), an end block value which is set in the end block designation register 121; and EQ, a coincidence signal from the comparison circuit 123, used as a load signal to the counter circuit 122.

The correspondence between the components in this embodiment and elements in the present invention is as follows: CPU 80*a* corresponds to the block selection means; the start block designation register 120 and the end block designation register 121 correspond to the block designation means; the counter circuit 122 corresponds to the printing element designation means; and the comparison circuit 123 corresponds to the drive control means.

Figure 2:
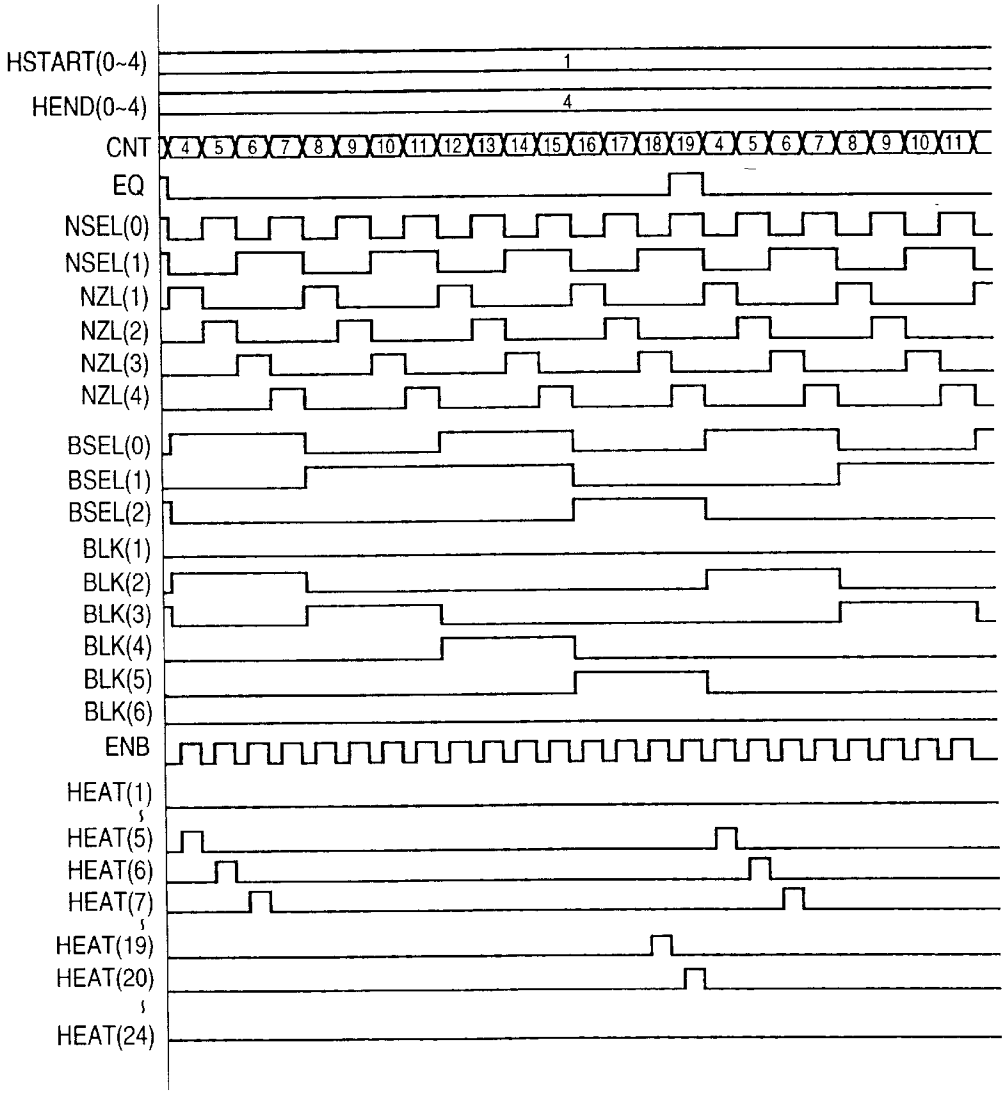
FIG. 2 is a timing chart showing respective signal states according to the first embodiment.
Figure 6:
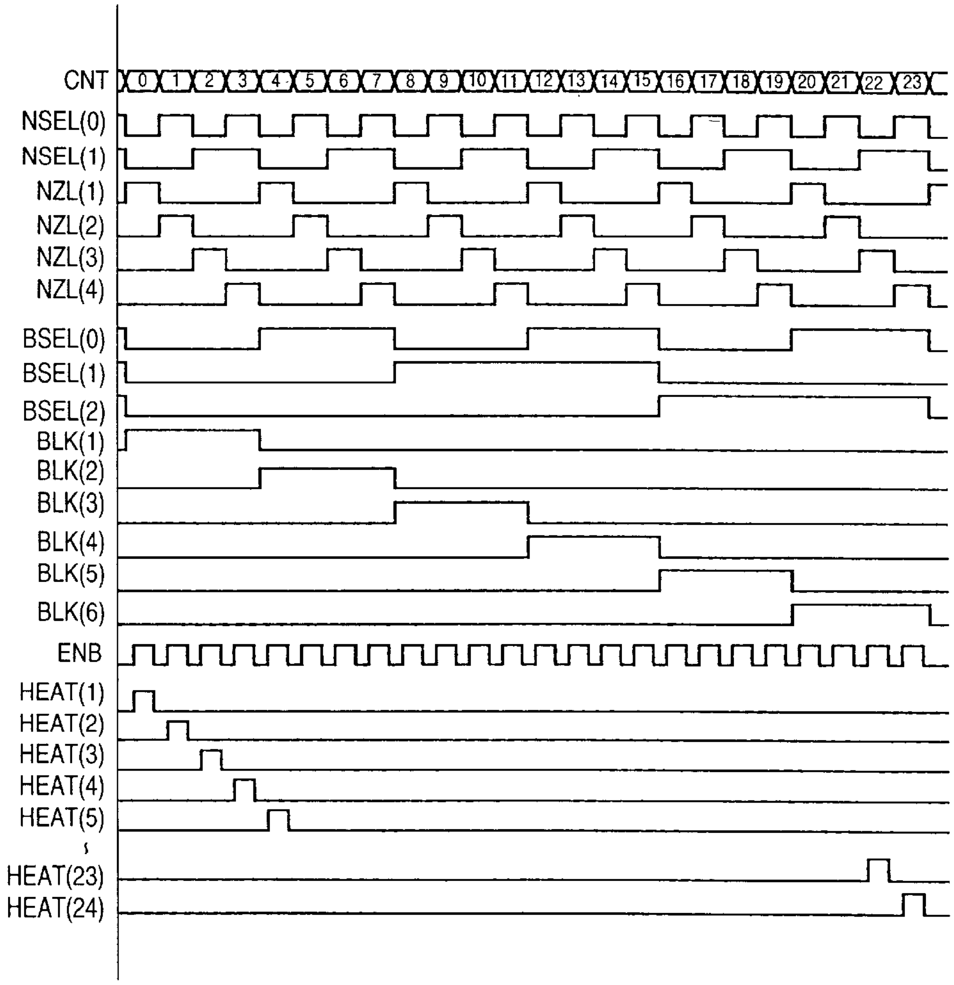
FIG. 6 is a timing chart in a case where all the nozzles are sequentially driven by the circuit in FIG. 5.
Figure 7:
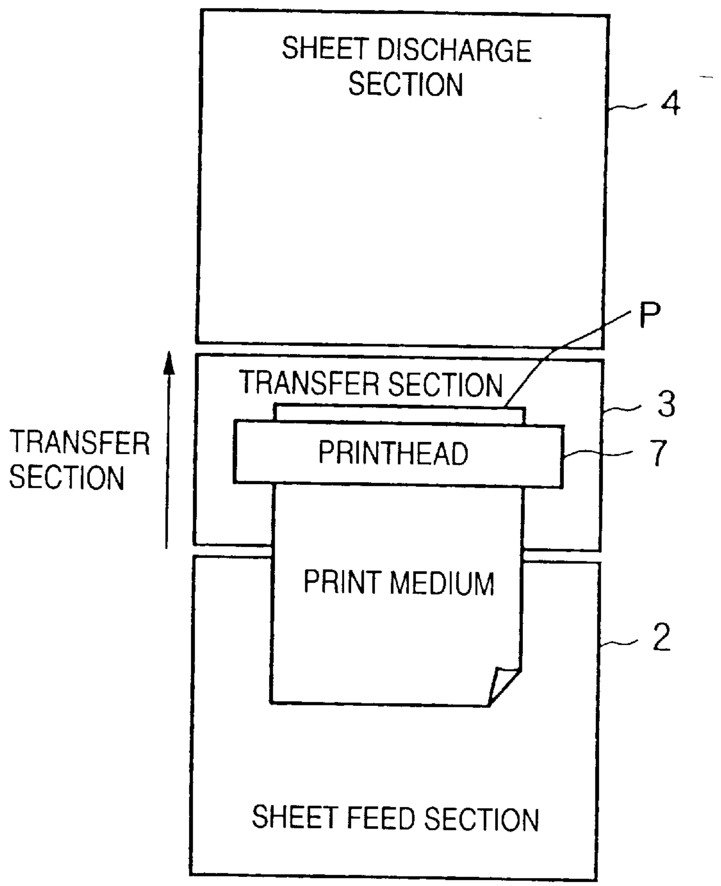
FIG. 7 is a schematic diagram showing the structure of the printing apparatus having the full-line type printhead.

FIG. 2 is a timing chart showing the respective signal states when nozzles belonging to the second block to the fifth block are driven. In FIG. 2, signals not shown in FIG. 1 correspond to those explained in connection to FIGS. 5 and 6.

Hereinbelow, the operation to drive the nozzles belonging to the second to fifth blocks will be described with reference to FIGS. 1 and 2.

First, as block numbers corresponding to printing start position and printing end position, the CPU sets a value "1" indicating the second block in the start block designation register 120, and sets a value "4" indicating the fifth block in the end block designation register 121.

When the value of the counter circuit 122 corresponds to "19 (set value "4"×4+3)" as, the last nozzle of the block set in the end block designation register 121, the coincidence signal EQ of the comparison circuit 123 becomes "1". Then the value "4 (set value "1"×4+0)" as the nozzle of the block set in the start block designation register 120 is loaded onto the counter circuit 122 at the next count timing, and the driving is started from the block set in the start block designation register 120.

By repeating the above operation, printing is performed by driving only the nozzles from the block set in the start block designation register 120 to the block set in the end block designation register 121.

As described above, according to the present embodiment, high-speed printing can be performed by avoiding unnecessary discharge control on nozzles which are not used in printing.

Second Embodiment

In the second embodiment, preliminary discharge is performed only on nozzles which have not been used in printing, to reduce wasteful ink consumption and printing period upon continuous printing on plural print media. The nozzle designation circuit 112 of the conventional art as shown in FIG. 5 has a construction as shown in FIG. 3.

Note that in this embodiment, the circuit of FIG. 5 including the circuits in FIG. 1 are provided in the gate array 80*d* in FIG. 10; however, the circuits may be provided in a device other than the gate array. Further, in the following description, constituent elements corresponding to those in the first embodiment have the same reference numerals, and detailed explanations of those elements will be omitted.

Figure 3:
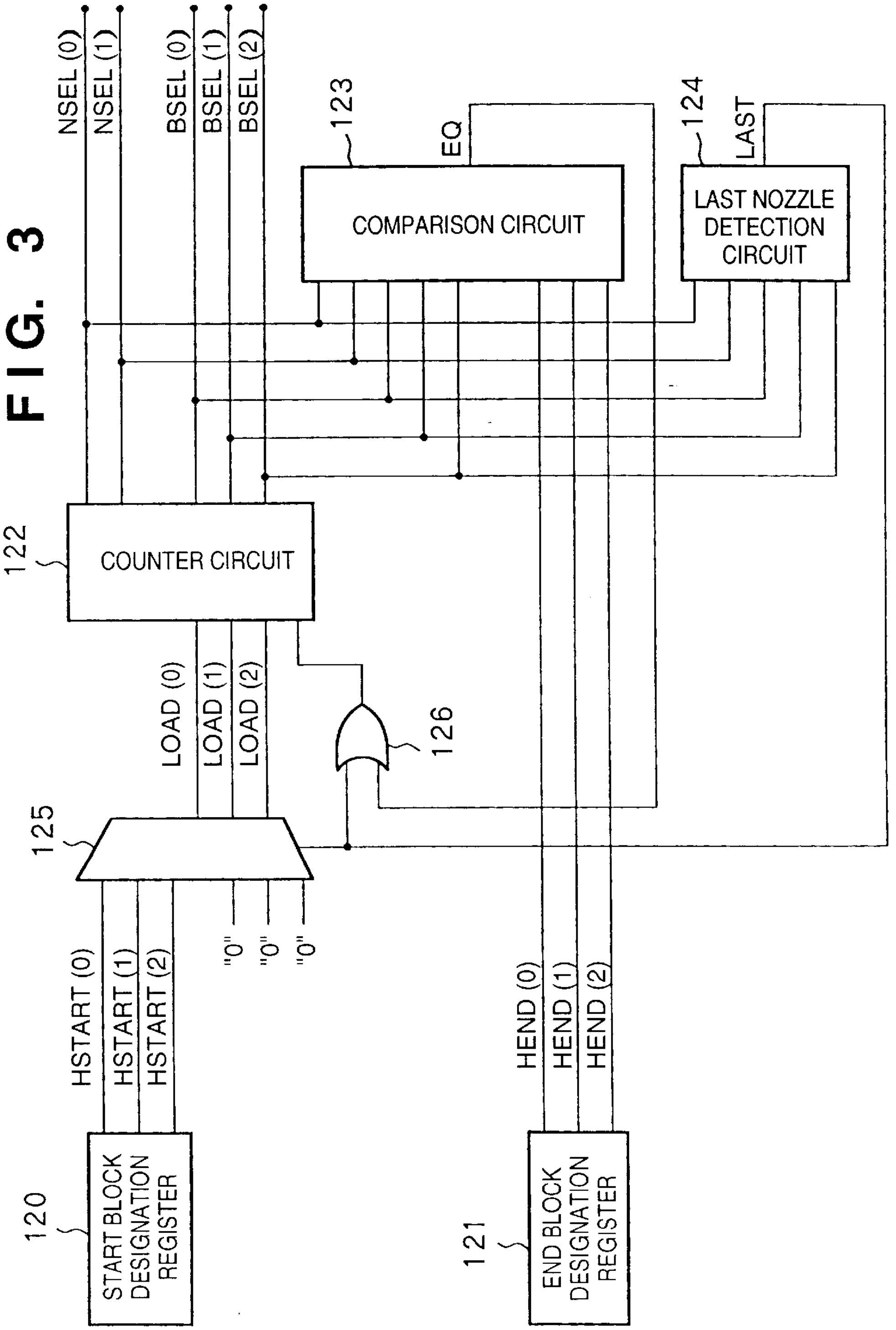
FIG. 3 is a block diagram showing the construction of the nozzle designation circuit according to a second embodiment of the present invention.

In FIG. 3, numeral 124 denotes a last nozzle detection circuit which outputs a value "1" when the value of the counter circuit 122 corresponds to a value obtained by subtracting "1" from a last nozzle number; 125, a counter-load value selection circuit which selects "0" as a load value to the counter circuit 122 if the last nozzle detection circuit 124 has detected a last nozzle, and otherwise selects the value set in the start block designation register 120 as a load value to the counter circuit 122; and 126, a 2-input OR gate which generates a load signal to load the value from the counter-load value selection circuit 125 onto the counter circuit 122, at the end block or last block.

Further, symbol LAST denotes a last nozzle detection signal whose value becomes "1" if the output from the counter circuit 122 corresponds to the last nozzle; and LOAD (0–2), load data as a load value of the counter circuit 122.

Figure 4:
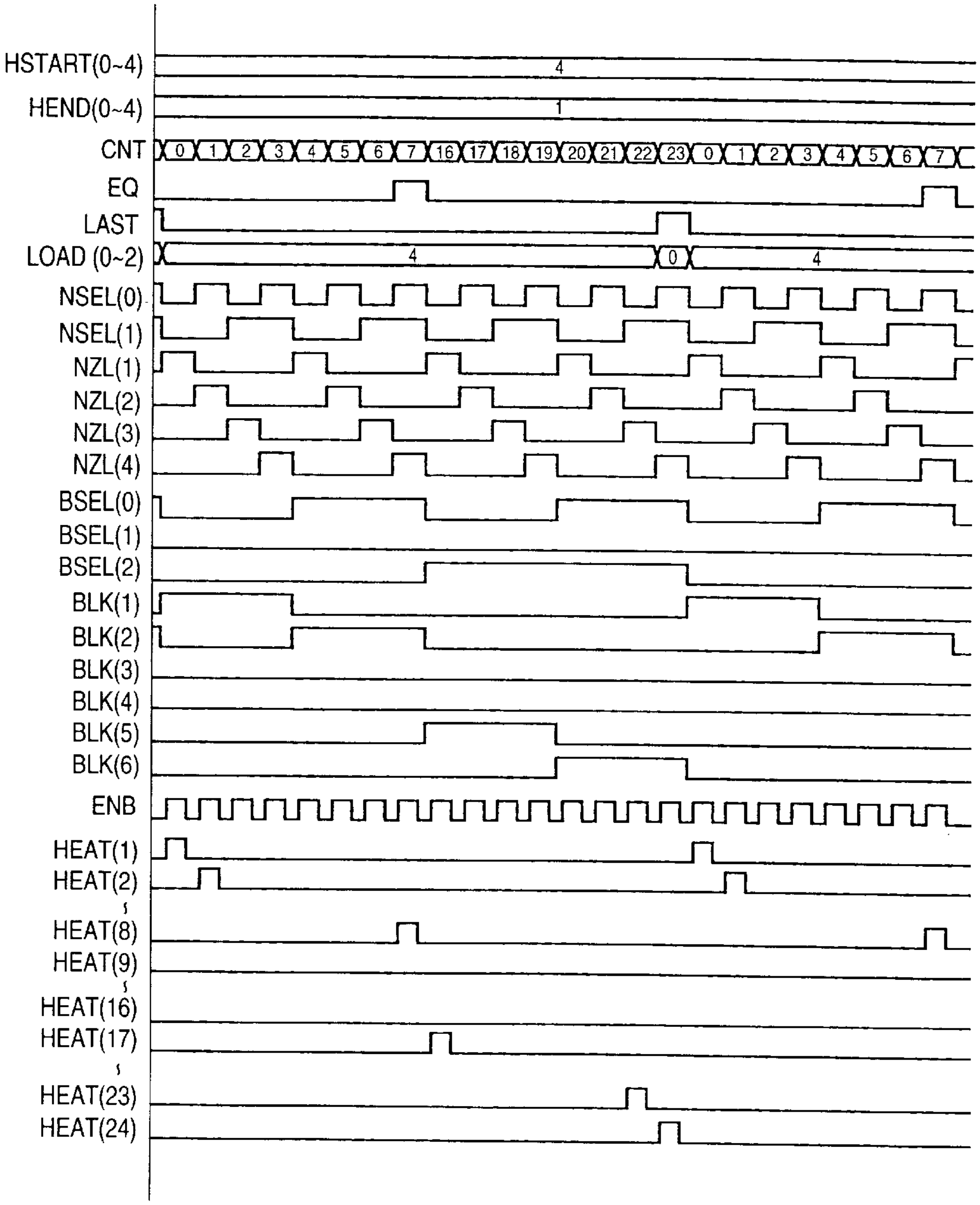
FIG. 4 is a timing chart showing the respective signal states according to the second embodiment.

FIG. 4 is a timing chart showing the respective signal states when a value "1" indicating the second block is set in the end block designation register 121 and a value "4"

indicating the fifth block is set in the start block designation register 120 such that preliminary discharge is performed from the first and second blocks and the fifth and the sixth blocks among the six blocks.

Hereinbelow, preliminary discharge from nozzles in both end blocks except the third and fourth blocks, i.e., a first discharge range from the first to second blocks, and a second discharge range from the fifth to sixth blocks, will be described with reference to FIGS. 3 and 4.

First, as block numbers corresponding to printing start position and printing end position, the CPU sets a value "1", obtained by subtracting "1" from the last block number "2" in the first discharge range, in the end block designation register 121, and sets a value "4" obtained by subtracting "1" from the start block number "5" in the second discharge range, in the start block designation register 120.

Thereafter, preliminary discharge is sequentially performed from the first block, and when the value of the counter circuit 122 becomes "7" indicating the last nozzle of the second block in the first discharge range, it is detected by the comparison circuit 123 that the value corresponds to the nozzle value "7 (set value "1"×4+3)" obtained from the value "1" set in the end block designation register 121. Then at the next count timing, a nozzle value "16 (set value "4"×4)" obtained from the value "4" set in the start block designation register 120 is loaded onto the counter circuit 122. Processing for the third and fourth blocks is omitted.

Then, preliminary discharge is performed from the fifth block to the final sixth block. When the last nozzle detection circuit 124 detects that the value of the counter circuit 122 becomes "23" indicating the last nozzle, the last nozzle detection circuit 124 outputs a last nozzle detection signal LAST. Then a value "0" selected by the counter-load value selection circuit 125 is loaded onto the counter circuit 122, to repeat the preliminary discharge from the initial first block.

As described above, according to the present embodiment, wasteful ink consumption can be suppressed and the printing period upon continuous printing on plural print media can be reduced by performing preliminary discharge only on nozzles which have not been used in printing.

Other Embodiment

The above embodiments have exemplified an ink-jet printing apparatus; however, the present invention is applicable to any printing apparatus for performing printing in accordance with printing methods other than the ink-jet method. Further, the present invention is optimally applied to a printing apparatus having a full-line type printhead with an array of printing elements corresponding to a print medium width, but is also applicable to a printing apparatus having a printhead mounted on a carriage for scanning across a recording medium.

In the above embodiments, droplets discharged from the printhead are ink droplets, and a liquid stored in the ink tank is ink. However, the liquid to be stored in the ink tank is not limited to ink. For example, a treatment solution to be discharged onto a print medium so as to improve the fixing property or water resistance of a printed image or its image quality may be stored in the ink tank.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, those practiced by use of the basic arrangement and principle disclosed in, for example, U.S. Pat. Nos. 4,723,129 and 4,740,796, are preferable. The above system is applicable to either one of the so-called on-demand type or continuous type method. Particularly, in the case of the on-demand type, the system is effective because, by applying in at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main body and can receive ink from the apparatus main body upon being mounted on the apparatus main body is applicable to the present invention as well as a cartridge type printhead in which an ink tank is integrally arranged on the printhead itself as described in the above embodiment.

It is preferable to add recovery means for the printhead, preliminary auxiliary means and the like to the above-described construction of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader and the like, or a facsimile apparatus having a transmission/reception function in addition to an image output terminal of an information processing apparatus such as a computer.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium storing program code for performing the: aforesaid processes to a system or an apparatus, reading the program code with a computer (e.g., CPU, MPU) of the system or apparatus from the storage medium, then executing the program.

In this case, the program code read from the storage medium realizes the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and a ROM, can be used for providing the program code.

Furthermore, besides aforesaid functions according to the above embodiments being realized by executing the program code which is read by a computer, the present invention includes a case where an OS (operating system) or the like working in the computer performs a part of or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion section which is connected to the computer, a CPU or the like contained in the function expansion card or section performs a part of or entire processes in accordance with designations of the program code and realizes functions of the above embodiments.

If the present invention is realized as a storage medium, program code corresponding to the above mentioned timing charts (FIG. 2 and/or FIG. 4) is to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which performs printing by using a printhead having an array of printing elements, comprising:

block selection means for dividing the array of printing elements into plural blocks, each having a predetermined number of printing elements, and designating a range of blocks to be used for printing by selecting blocks among the plural blocks;

printing element designation means for designating a printing element to be driven in each of the blocks in the range; and drive control means for driving respective printing elements by operating said printing element designation means only for the blocks in said range, wherein said block selection means designates the range of blocks by using a first block number and a second block number among the plural blocks.

2. The printing apparatus according to claim 1, wherein said block selection means selects blocks within a range from the first block number to the second block number.

3. The printing apparatus according to claim 1, wherein said block selection means selects blocks within two ranges with at least one range including the first block number and the second block number.

4. The printing apparatus according to claim 1, wherein said block selection means has plural registers each for storing a block number to be designated.

5. The printing apparatus according to claim 1, wherein said printhead is a full-line type printhead having an array of printing elements corresponding to a width of the printing medium.

6. The printing apparatus according to claim 1, wherein said printing element designation means designates the printing elements one by one in each block in the range, sequentially.

7. The printing apparatus according to claim 1, wherein said printhead is an ink-jet printhead which performs printing by discharging ink.

8. The printing apparatus according to claim 7, wherein said printhead discharges the ink by utilizing thermal energy, and has thermal energy transducers to generate the thermal energy to be supplied to the ink.

9. The printing apparatus according to claim 7, wherein said drive control means controls to perform preliminary discharge only for printing elements included in a block not in the range.

10. The printing apparatus according to claim 1, wherein said block selection means selects blocks within at least one range defined by the first block number and the second block number.

11. A printing method for performing printing by using a printhead having an array of printing elements, comprising:

a block selection step of dividing the array of printing elements into plural blocks, each having a predetermined number of printing elements, and designating a range of blocks to be used for printing by selecting blocks among the plural blocks;

a printing element designation step of designating a printing element to be driven in each of the blocks in the range; and a drive control step of driving respective printing elements by performing said printing element designation step only for the blocks in the range, wherein in said block selection step, the range of blocks is designated by using a first block number and a second block number among the plural blocks.

12. The printing method according to claim 11, wherein in said block selection step, blocks within a range from the first block number to the second block number are selected.

13. The printing method according to claim 11, wherein in said block selection step, blocks within two ranges with at least one range including the first block number and the second block number are selected.

14. The printing method according to claim 11, wherein in said block selection step, blocks within at least one range defined by the first block number and the second block number are selected.

15. A printing apparatus which performs printing by using a printhead having an array of printing elements, comprising:

block selection means for dividing the array of printing elements into plural blocks, each having a predetermined number of printing elements, and designating at least one block to be used for printing by selecting at least one block among the plural blocks, a number of the at least one designated block being less than that of the plural blocks; and control means which controls to drive the at least one designated block such that a driving period for the printhead is an integer multiple of a predetermined driving period for one block, while omitting a driving period for an undesignated block, the integer being the number of the at least one designated block.

16. A printing method for performing printing by using a printhead having an array of printing elements, comprising the steps of:

dividing the array of printing elements into plural blocks, each having a predetermined number of printing elements, and designating at least one block to be used for printing by selecting at least one block among the plural blocks, a number of the at least one designated block being less than that of the plural blocks; and driving the at least one designated block such that a driving period for the printhead is an integer multiple of a predetermined driving period for one block, while omitting a driving period for an undesignated block, the integer being the number of the at least one designated block.

* * * * *